United States Patent [19]

Komuro

[11] Patent Number: 4,687,072
[45] Date of Patent: Aug. 18, 1987

[54] INSTRUMENT DISPLAY SYSTEM

[75] Inventor: Katsusuke Komuro, Tokyo, Japan

[73] Assignee: Honda Giken Kogyo Kabushiki Kaisha, Tokyo, Japan

[21] Appl. No.: 817,787

[22] Filed: Jan. 7, 1986

Related U.S. Application Data

[63] Continuation of Ser. No. 520,019, Aug. 3, 1983, abandoned.

[30] Foreign Application Priority Data

Aug. 9, 1982 [JP] Japan ................................ 57-138238
Aug. 13, 1982 [JP] Japan ................................ 57-141530
Aug. 13, 1982 [JP] Japan .......................... 57-123560[U]
Aug. 13, 1982 [JP] Japan ................................ 57-141529

[51] Int. Cl.$^4$ .......................... B60Q 3/04; G09F 9/35
[52] U.S. Cl. ..................................... 180/219; 340/705
[58] Field of Search ................ 180/219; 340/705, 753, 340/754, 765, 784, 87, 89, 97, 98

[56] References Cited

U.S. PATENT DOCUMENTS 3,317,906 5/1967 Baldridge ............................ 340/705
3,899,786 8/1975 Greubel et al. ..................... 340/705
3,979,743 9/1976 Moore ................................ 340/705
4,319,657 3/1982 Nomura .............................. 180/219
4,427,214 1/1984 Häggkuist .......................... 180/219

FOREIGN PATENT DOCUMENTS 2019627A 10/1979 United Kingdom .
2056740A 3/1981 United Kingdom .

Primary Examiner—John J. Love
Assistant Examiner—Donn McGiehan
Attorney, Agent, or Firm—Lyon & Lyon

[57] ABSTRACT

A system for a motorcycle to display various vehicle monitoring readings having a lightweight liquid crystal plate element mounted on the vehicle front within easy view of the motorcycle operator and a control unit for the plate element mounted closer to the motorcycle's center of stability. Also incorporated into the system is the provision for rear illumination, by sunlight or by illumination lamp, of such a liquid crystal plate element. An adjustable shielding member mounted on such a liquid crystal plate element assists the motorcycle operator in reducing glare on the display surface of such a plate element.

13 Claims, 16 Drawing Figures

INSTRUMENT DISPLAY SYSTEM

This application is a continuation of application Ser. No. 520,019, filed Aug. 3, 1983 and now abandoned.

BACKGROUND OF THE INVENTION

The field of the present invention is instrument display systems for motorized cycles.

Conventional motorcycles have various meters and displays to inform the motorcycle operator of the operating conditions of the motorcycle. Generally, the speedometer, tachometer and other informational displays are disposed in front of the motorcycle handle center. These meters are normally mounted independently of each other and are relatively large in size and high in weight because their display unit and control unit are integrally composed. Their size and weight hinder the simplification of the design and construction in front of the handle center and the choices for their installed location are limited. An additional problem is that, because of their weight and size, they must generally be installed such that their display surfaces are relatively low in the region of the steering handle.

Liquid crystal meter displays are being adopted in the design of various vehicles because they consume less power and have a more modern appearance. However, such liquid crystal meters generally have been integrally combined with their control unit and, as a result, they remain heavy and cumbersome. Most of these meters are mounted in meter cases that contain the control unit as well as illumination lamps, see for example FIG. 1. This design concept, coupled with its weight factor, limits the size of the liquid crystal display.

SUMMARY OF THE INVENTION

The present invention is directed to a system for improving the display system on any sort of motorized cycle. A liquid crystal plate element may be mounted either on the handle bar structure or in front of the handlebar structure of the motorcycle while the control unit, which constitutes the bulk of the weight of any display meter, may be mounted at any suitable design point on the motorcycle.

The separation of the display surface and the control unit obviates the problem of mounting a bulky iteme above and in front of the vehicle. Such a design allows for a larger display surface with minimal weight gain. It also allows for the display surface to be mounted at such a level as to minimize the amount of eye movement required of the motorcycle operator when moving his eye from the eye position for driving to the eye position for reading the display.

The rear of the liquid crystal display element may be exposed in a further aspect of the present invention to allow some light to strike the liquid crystal display element from both sides. This arrangement increases the clarity of the liquid crystal display and simplifies the taking of a reading by the motorcycle operator with a quick glance.

Finally, a shiftable shielding member may be provided on top of the liquid crystal plate element that assists the motorcycle operator in reading the liquid crystal display. The shielding member may be positioned by the motorcycle operator for best effect, either by shielding out sunlight and thereby reducing glare upon the liquid crystal display or by shielding any night illumination from the liquid crystal display.

Accordingly, it is an object of the present invention to provide an improved instrument display system for a motorized cycle. Other and further objects and advantages will appear hereinafter.

DETAILED DESCRIPTION OF THE PREFERRED EMBODIMENT

Figure 1:
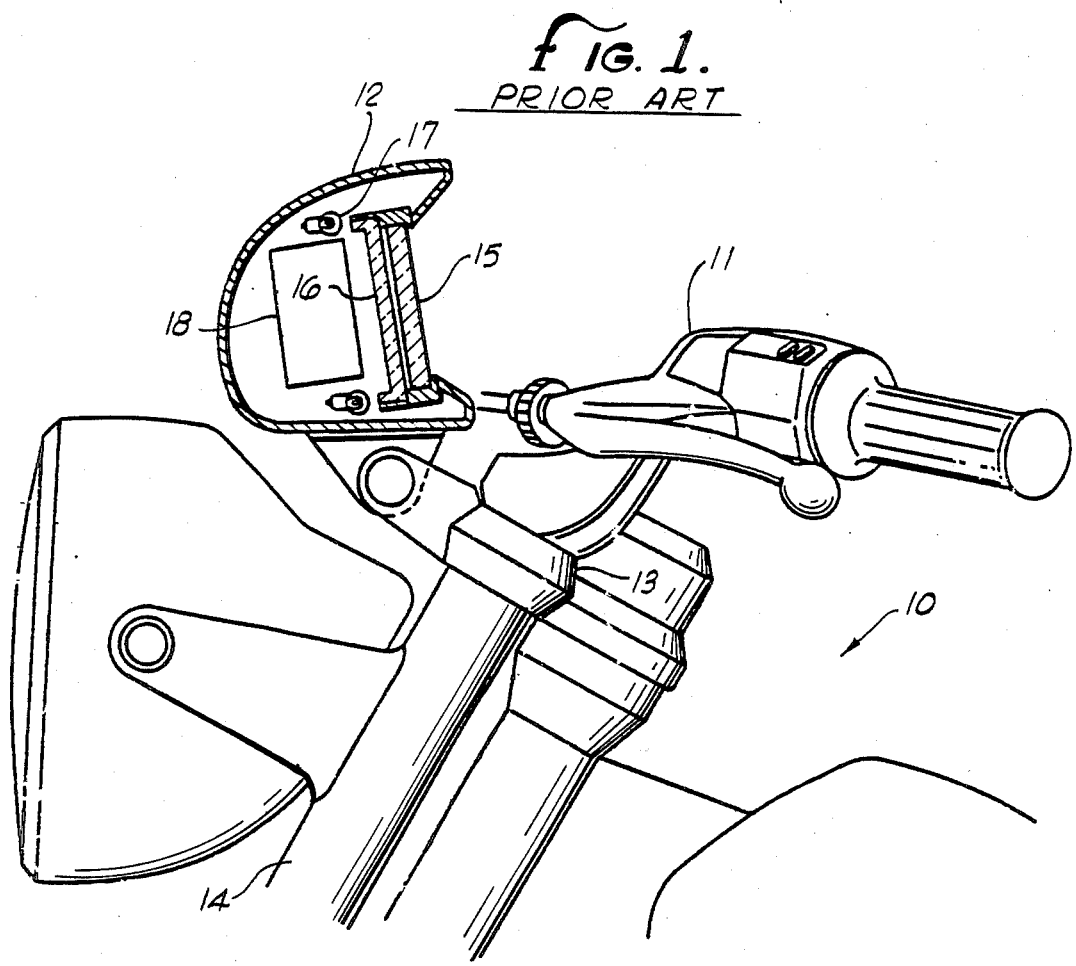
FIG. 1 is a sectional view of a conventional liquid crystal meter mounted upon a motorcycle as they exist in the prior art.

Turning in detail to the drawings, portions of motorcycles 10 are illustrated. The motorcycle 10 may be any one of a number of small motorized vehicles employing a handlebar assembly. As shown in FIG. 1, liquid crystal meters are currently installed on motorcyles in front of the steering handle 11 of the body 10 of the motor cycle. A meter case 12 is installed on a bridge 13 on top of a front fork 14. A liquid crystal display unit 15 of the liquid crystal meter is provided at the face of the meter case 12. On the backside of the liquid crystal display unit 15, a screen 16 of glass plate of transparent plastic plate and night illumination lamps 17 are installed. An electric control circuit unit 18 is housed in the meter case 12 and electrically connected to the liquid crystal cell of a liquid crystal display unit 15. In liquid crystal meters of this type, illumination of the liquid crystal having no self-luminescence relies soley on the sunlight irradiating on the liquid crystal surface during the daytime and relies on the light of the illumination lamps 17 at the rear surface during the nighttime.

Figure 2:
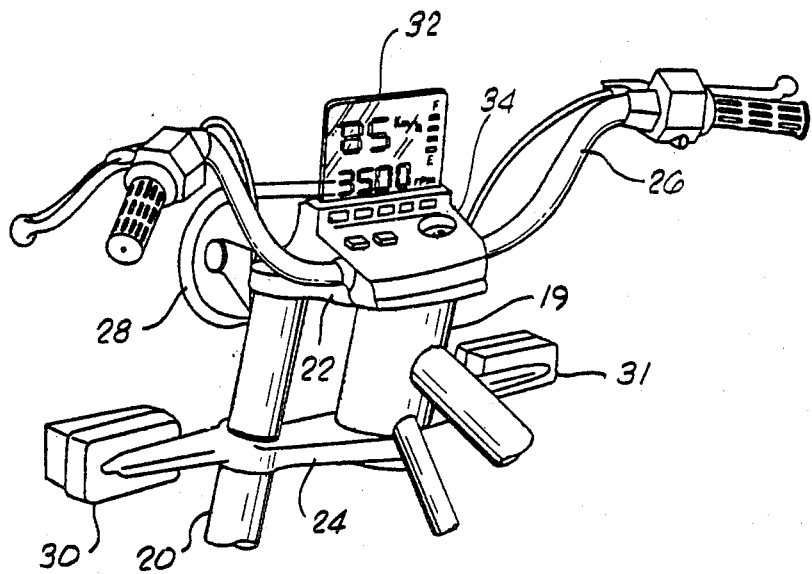
FIG. 2 is an oblique view showing an embodiment of the liquid crystal display system of this invention mounted in front of the handlebar assembly of the motorcycle.
Figure 3:
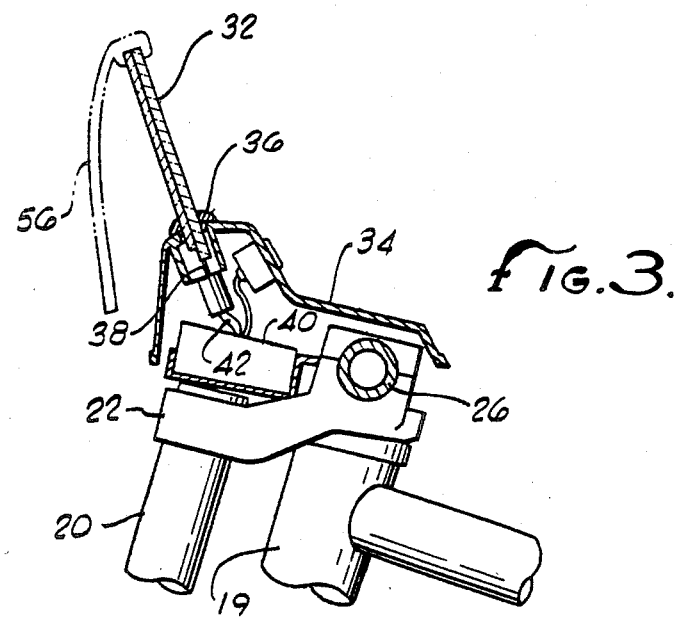
FIG. 3 is a side view, partly in section, of the display system of FIG. 2 with the addition of an optional cover member installed on the display unit.

Turning to the embodiments of the present invention is FIGS. 2 and 3, a head pipe 19 and a front fork 20 are connected to each other through an upper bridge 22 and a lower bridge 24. A steering handle 26 is installed on the upper bridge 22; and a headlight 28, a left blinker lamp 30, and a right blinker lamp 31 are installed on the front forks 20. A handle cover 34 is provided on top of the upper bridge 22.

A liquid crystal display unit 32 comprising a plate element is installed on a handle cover 34 so that it is located in front of the steering handle 26 and positioned upright. The display unit 32 is installed at its lower end on the handle cover 34 through a seal member 36 with an electrode 38 secured to the lower end. The display unit 32 is so composed as to be able to display the vehicle speed, engine rpm, remaining fuel quantity and other desired readouts. An electric control circuit unit 40 for controlling the display unit 32 is provided on the handle cover 34 separately from the display unit 32, the control unit 40 being connected to the display unit 32 through a lead wire 42.

Figure 4:
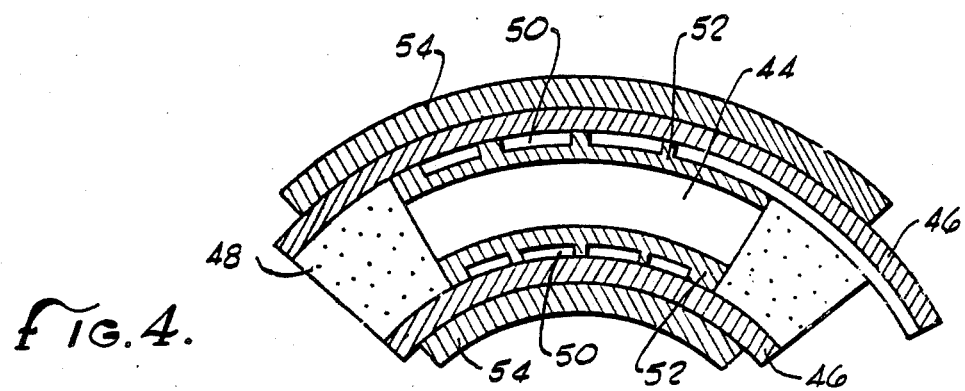
FIG. 4 is a sectional view showing a basic form of the plastic film liquid crystal display element.

With respect to the plate element constituting the liquid crystal display unit 32, a plastic film liquid display device may be used formed by enclosing liquid crystal in a flexible transparent plate of plastic. The basic form of the liquid crystal display device is shown in FIG. 4. In FIG. 4, liquid crystal 44 is enclosed between a pair of polyester films 46 joined to each other with adhesive 48. A transparent electrode 50 and a conductor 52 are placed between the liquid crystal 44 and the pair of polyester films 46, and a polarizer 54 is secured to the outer surface of each of the pair of polyester films 46. Unlike conventional glass liquid crystal display devices commonly in use, the plastic film liquid crystal display device of such a composition is flexible.

As it is so far described, the display unit 32 is provided as a single unit; however, as shown by the phantom lines in FIG. 3, a cover member 56 may be installed on the display unit 32. This arrangement prevents the display unit 32 from being directly exposed to wind pressure while the motorcycle is being driven. The display unit 32 is thereby protected, prolonging its service life.

Figure 5:
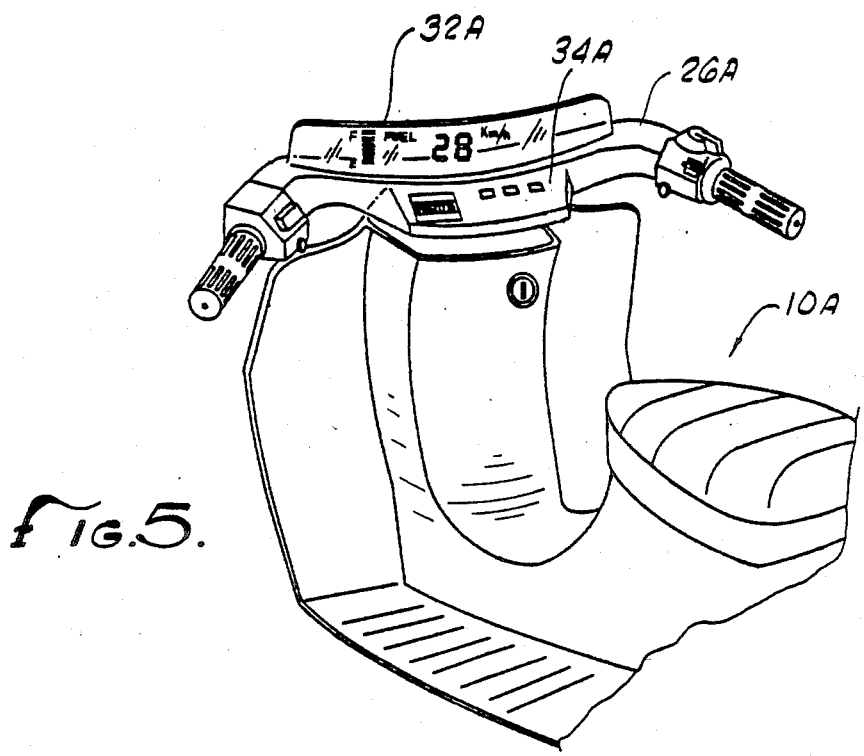
FIG. 5 is an oblique view showing an embodiment of the liquid crystal display system of this invention mounted across the handlebar assembly of a motorcycle.
Figure 6:
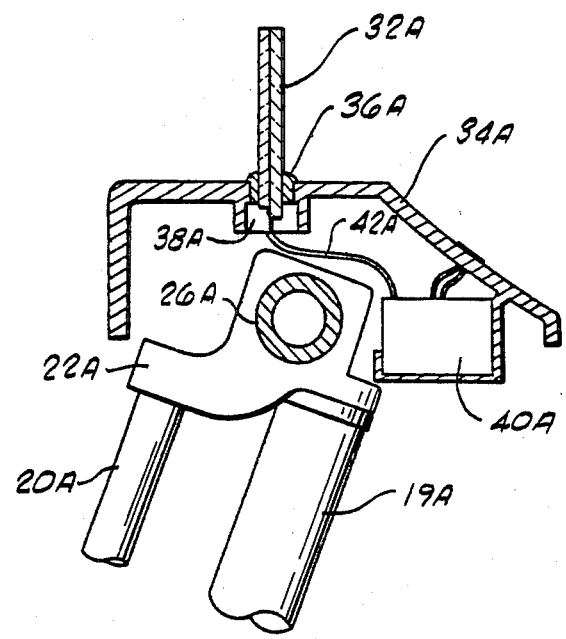
FIG. 6 is a side view partly in section of the display system of FIG. 5.

FIGS. 5 and 6 show an alternate type of motorcycle 10A. The motorcycle 10A is provided with a steering handle 26A that is generally horizontal and a handle cover 34A that covers nearly the whole of the steering handle 26A. On the handle cover 34A, a display unit 32A comprising a plate element is installed in a standing manner flatly lengthwise or curvedly lengthwise, curving slightly along the longitudinal direction of the handle cover 34A. The display unit 32A can be composed of a flexible element as was shown in FIG. 4. The display unit 32A is installed at its lower end on the handle cover 34A through a seal member 36A, with an electrode 38A secured to said lower end. An electric control circuit unit 40A for controlling the display unit 32A is provided in the handle cover 34A separately from the display unit 32A, said control unit 40A being connected to the display unit 32A through a lead wire 42A.

In this described embodiment, the liquid crystal display unit 32A is provided as a single unit; however, a reinforcing frame comprising some form of transparent member may be installed on the periphery of the display unit 32A, and it is also possible to install a transparent cover member to protect against rain and other elements.

As is seen from the foregoing FIGS. 2 through 6, in accordance with this invention, the display unit is constituted with a plate element, said display unit being separated from the electric control circuit unit, and is provided upright on top of the vehicle body front or erect on the handle lengthwise along the longitudinal direction of said handle, so that the thinness and lightness that are the characteristics of the liquid crystal display plate element function effectively, enabling simplification and weight reduction of the construction surrounding the handle and vehicle body front. Due to its light weight, the display surface can be set at a higher level than conventional display surface or it may be made larger so that the amount of movement of the motorcycle operator's eyes from the eye position for driving to the eye position for reading the display is reduced. Furthermore, the liquid crystal display element may be essentially a transparent body. If this is true, the invention arrangement also serves as a small windscreen, increasing the riding comfort of the motorcycle operator.

Figure 7:
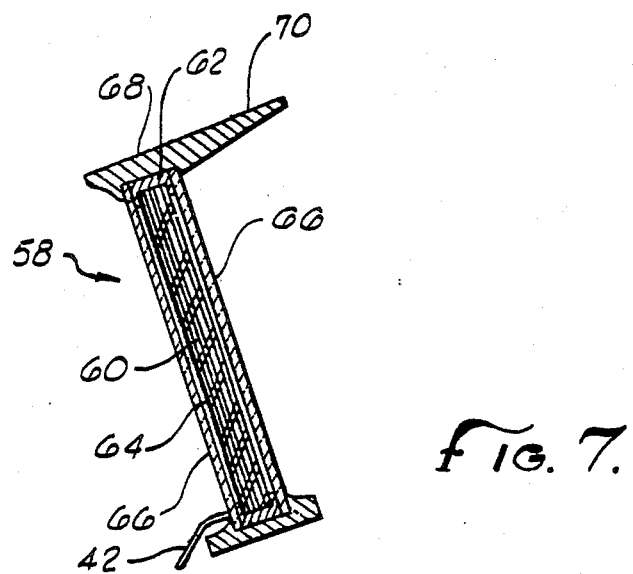
FIG. 7 is a vertical sectional view of the liquid crystal meter.

FIG. 7 shows a vertical sectional view of a liquid crystal meter. In a liquid crystal display unit of a liquid crystal meter 58, a liquid crystal cell body 60 holding liquid crystal between glass plates or plastic plates is supported by a liquid crystal cell holding unit 62. A semitransparent reflecting plate 64 is provided on the back of the liquid crystal cell body 60. The liquid crystal display unit is protected at both surfaces by transmittable protective plates 66 of glass or plastic, is transmittably opened at the rear surface and is installed on a frame 68. At the top of the frame 68, a visor 70 is formed to block out sunlight glare and thereby to make the liquid crystal display unit easier to read.

Figure 8:
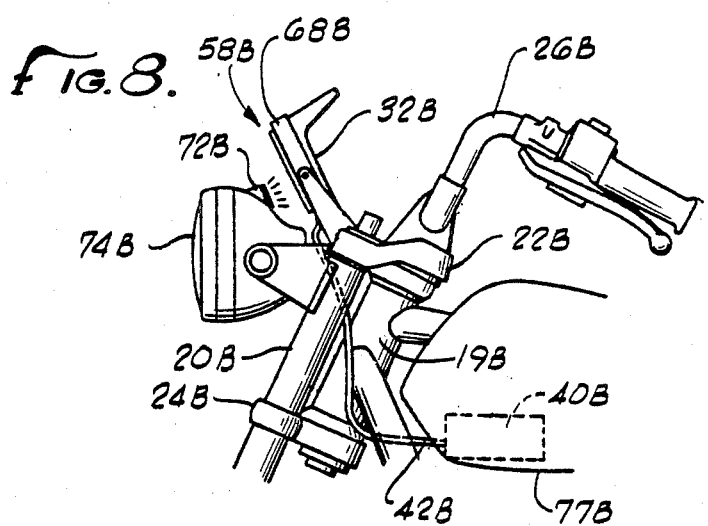
FIG. 8 is a side view of the liquid crystal meter system, with its rear surface exposed, mounted on a motorcycle of standard type.

FIG. 8 shows an embodiment wherein the liquid crystal display unit of FIG. 7 is installed on a motorcycle of standard type. The frame 68B of the liquid crystal meter 58B is installed on an upper bridge 22B on top of a front fork 20B in front of the vehicle body of the motorcycle and the backside of the liquid crystal display unit 32B is open. When the sunlight impinges on the motorcycle from the front of the vehicle body, the back of the liquid crystal display unit 32B is directly irradiated by the sunlight. A night illumination lamp 72B is provided on the back of a headlight 74B so that the liquid crystal display unit 32B is irradiated from the back at night. An electric control circuit unit 40B is installed on the lower part of the fuel tank 76B and is connected to the liquid crystal display unit 32B through an electrode lead wire 42B.

Figure 9:
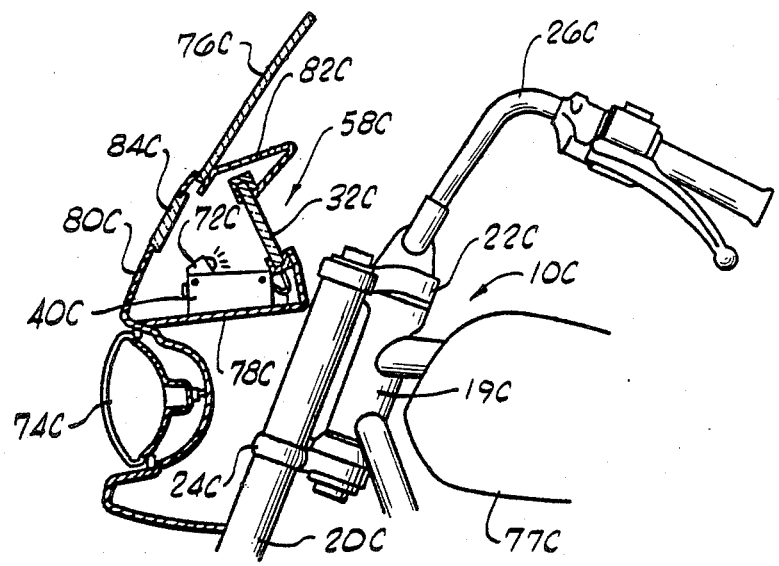
FIG. 9 is a vertical sectional view of the liquid crystal meter system of FIG. 8 mounted inside the fairing of a motorcycle provided with a windscreen.

FIG. 9 shows another embodiment wherein the liquid crystal meter 58C is installed on a motorcycle provided with a windscreen 76C. A meter case 78C is assembled to the inside of a fairing 80C provided in front of the vehicle body 10C on which a headlight 74C and the windscreen 76C are installed, and a liquid crystal display unit 32C is fitted on the front thereof. In this figure, an upper visor 82C is formed as part of the meter case 78C. A translucent or transparent plate 84C is fitted into the fairing 80C opposite to the rear surface of the liquid crystal unit 32C, so that when the sunlight impinging toward at front of the motorcycle, the sunlight is guided to the rear of the liquid crystal display unit 32C through the plate 84C. Both the electric control circuit unit 40C and a night illumination lamp 72C are housed within the meter case 78C.

Figure 10:
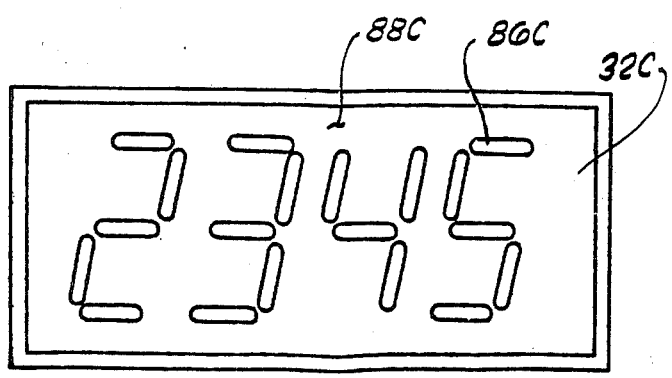
FIG. 10 is a front view of a typical liquid crystal display unit.

In such a liquid crystal display unit 32C, when the sunlight is coming from behind, segments 86C of the liquid crystal display unit 32C shown in FIG. 10 absorb the light reflected by the semi-transparent reflecting plate shown in FIG. 7 and appear dark while the blank space 88C reflects the sunlight to be bright, so that a display by the segments 86C is clear. Alternatively, when the sunlight is coming from ahead, the segments 86C of the liquid crystal display unit 32C absorb the light at the surface side as it passes through the semi-transparent reflecting plate to appear dark in silhouette and the blank space 88C transmits the sunlight to be bright.

Figure 11:
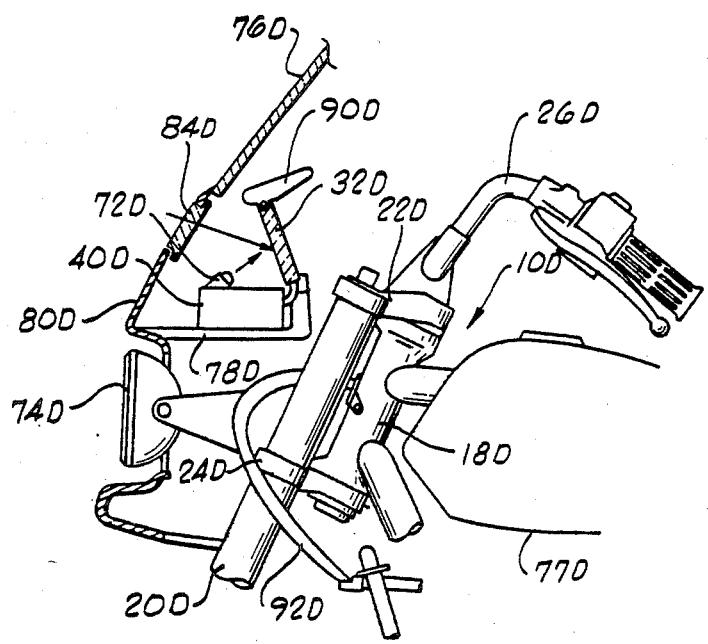
FIG. 11 is a side view partly in section showing an embodiment of the liquid crystal display system mounted inside the fairing of a motorcycle provided with a windscreen including a shiftable shielding member.
Figure 12:
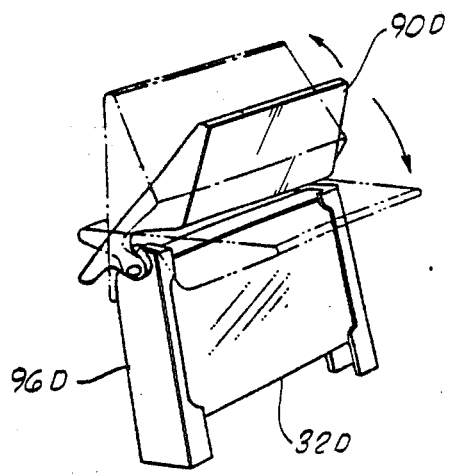
FIG. 12 is an enlarged oblique view showing the liquid crystal unit of FIG. 11 mounted with a shiftable shielding member.

FIG. 11 shows a side view of an alternative embodiment of this invention including a shiftable shielding member 90D. A fairing 80D is mounted on the front of a standard type motorcycle 10D that includes a head-pipe 18D, a front fork 20D, an upper bridge 22D, a lower bridge 24D, and a steering handle 26D. A support frame 92D is placed inside said fairing 80D. A headlight 74D is installed on the support frame 92D and is fitted through the fairing 80D. A windscreen 76D made of transparent plastic is installed on the upper end of the fairing 80D. A liquid crystal display system similar to that embodied in FIG. 9 is placed inside the fairing 80D. This includes a liquid crystal display unit 32D, a meter case 78D, an electric control circuit unit 40D, a night illumination lamp 72D, and a translucent or transparent plate 84D fitted into the fairing 80D. However, instead of an upper visor, a shiftable shielding member 90D is attached on top of the liquid crystal display unit 32D. The shielding member 90D is turnably and pivotably supported by the upper ends of guide members 96D provided on both sides of the liquid crystal display unit 32D, as shown in FIG. 12. The shielding member 90D is so composed as to be able to turn between two limit positions, both illustrated in phantom in FIG. 12. By rotating the shield member 90D, it can serve several purposes. By setting the shielding member 90D down during the nighttime, the shielding member 90D shields light to the windscreen 76D from the display surface of the liquid crystal display unit 32D. During the daytime, the shielding member 90D can be positioned to aid in cutting down on sunlight glare to the liquid crystal display unit 32D.

In the described embodiments, the display unit is constituted with a liquid crystal display plate element; however, the display unit is not limited to this, and it may be one comprising a plate element using a luminous diode, for example.

Figures 13, 14:
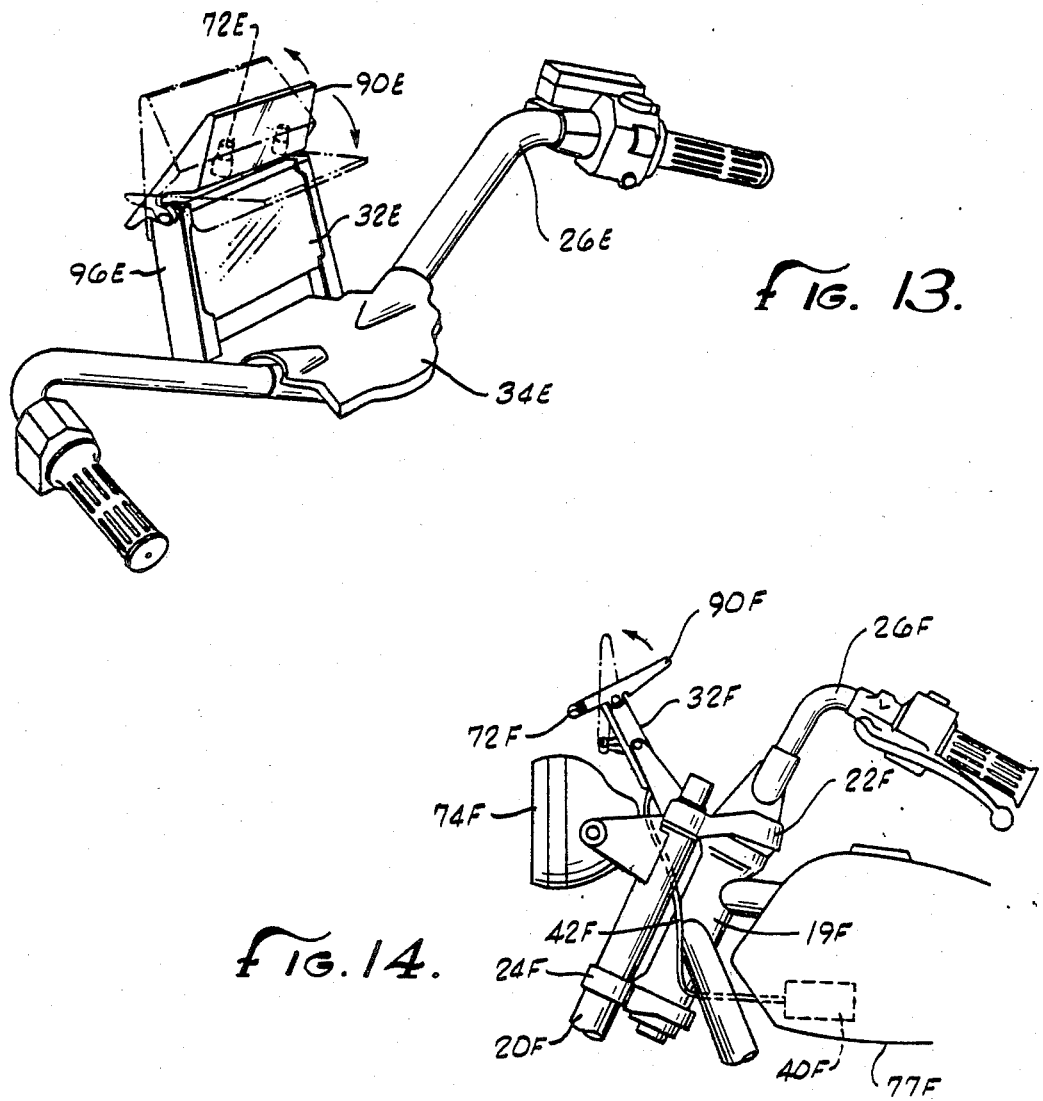
FIG. 13 is an oblique view showing another embodiment of the present invention mounted in front of the handlebar assembly of a motorcycle.
FIG. 14 is a side view showing a variant embodiment of the invention shown in FIG. 13 wherein the illumination lamp is integrally assembled within the shiftable shielding member.

FIG. 13 is another embodiment employing the shield member shown in FIGS. 11 and 12. In this embodiment the night illumination lamps 72E are incorporated in the shielding member 90E such that when the shielding member 90E is set in the lowered position, the display surface can be illuminated by the night illumination lamps 72E while light from the night illumination lamps 72E is prevented by the shielding member 90E from being reflected onto the windscreen.

FIG. 14 is a variant embodiment of FIG. 8 for a motorcycle without a windscreen. In this embodiment, the rear end of the shiftable shielding member 90F is extended in the direction of the headlight 74F and this extended rear end incorporates the night illumination lamps 72F for illuminating the rearside of the liquid crystal display unit 32F. During the daytime, the shielding member 90F can be set in the lowered position, and the sunlight will be allowed to strike directly on the backside of the liquid crystal display unit 32F while the glare of sunlight to the display surface is shielded by the shielding member 90F. During the nighttime, the shielding member 90F can be set in the raised position and the night illumination lamps 72F incorporated in the rear end of the shielding member 90F can illuminate the rearside of the liquid crystal display unit 32F.

Figure 15:
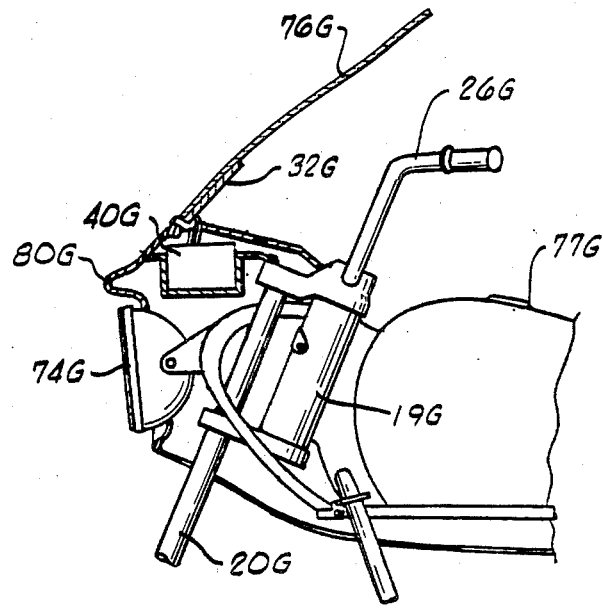
FIG. 15 shows a side view partly in section of another embodiment of the liquid crystal display system.
Figure 16:
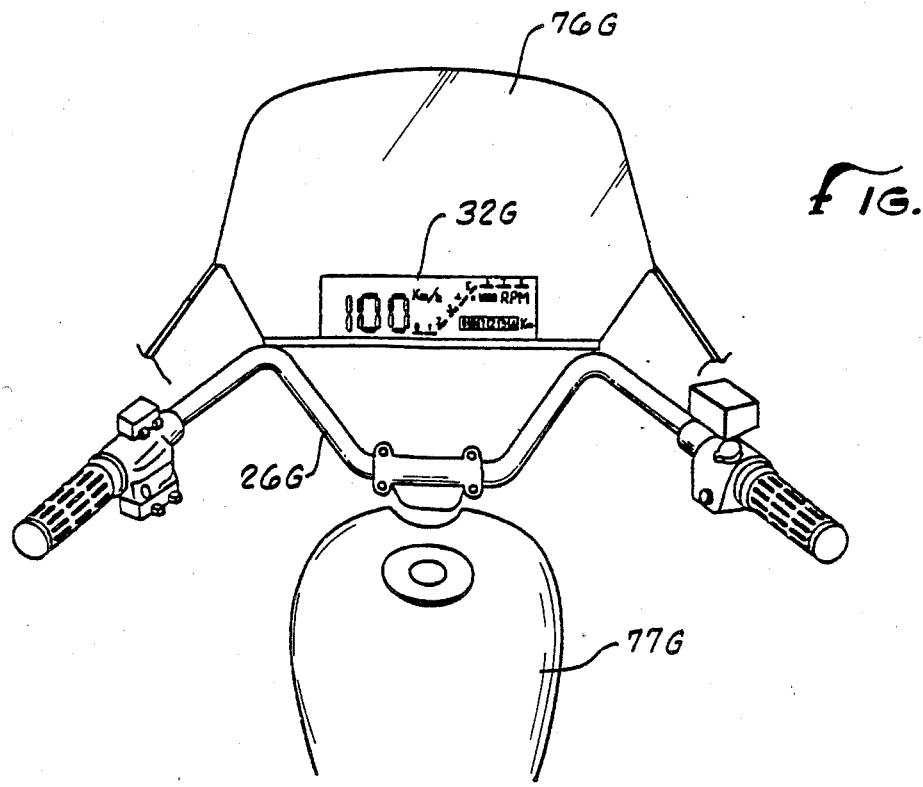
FIG. 16 is a rear of the embodiment of FIG. 15.

FIG. 15 and 16 illustrate yet another embodiment of the present invention. Corresponding numerals are incorporated to those discussed with the prior embodiments. The display unit 32G is shown to be mounted flush on the interior surface of the windscreen 26G with the control unit 40G located below.

Thus, a liquid crystal display system is disclosed for overcoming the design limitations of integrated control and display units, providing for more modern and stylish motorcycle designs. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A display system for a motorcycle having a vehicle body front including a steering handle system, comprising a liquid crystal display unit comprising a plate element and having a lower end;
said steering handle system comprising a handle cover mounted on a steering handle;
said lower end being installed on said handle cover in front of said steering handle, said liquid crystal display unit being in an upright position extending into the field of view of the motorcycle operator;
said liquid crystal display unit and said plate element being transparent, providing an unobstructed view forwardly of the motorcycle for observation therethrough by the motorcycle operation; and
a control unit mounted on said motorcycle separated from said plate element and being under said handle cover adjacent the center of the steering handle; and
an electrical connection between said plate element and said control unit.

2. The display system of claim 1 further comprising a cover member mounted on the top of said plate element and extending downwardly toward the front of said motorcycle.

3. The display system of claim 1 wherein said plate element includes a flexible transparent plate of plastic enclosing liquid crystal.

4. The display system of claim 1 wherein said plate element is mounted to the steering handle system.

5. The display of claim 1 wherein said plate element is mounted forwardly of the steering handle system on the motorcycle.

6. The display system of claim 1 wherein said plate element is constructed and arranged on the motorcycle to receive ambient light on both sides of said plate element.

7. A liquid crystal display system for a motorcycle, comprising
- a liquid crystal plate element having a display surface facing the rear of the motorcycle and a light transmitting open back surface;
- a semitransparent reflecting plate mounted on the rear of said liquid crystal plate element;
- a frame holding said liquid crystal plate element and said semitransparent reflecting plate on the motorcycle;
- a shielding member mounted on top of said liquid crystal plate element pivotally supported by said frame about an axis transverse to the motorcycle.

8. The liquid crystal display of claim 7 wherein said shielding member is pivotally mounted so as to selectively extend in a vertical position above said plate and in a horizontal position rearwardly.

9. The liquid crystal display system of claim 7 further comprising a night illumination lamp mounted so as to direct light toward the back of said plate element.

10. The liquid crystal display system of claim 7 wherein said display system is mounted inside a fairing on the motorcycle and further comprises light conductive plate fitting into said fairing opposite said back of said plate element.

11. The liquid crystal display system of claim 8 wherein said night illumination lamp is mounted in said shielding member such that said lamp is directed toward said back surface of said liquid crystal plate element when said shielding member is in the vertical position.

12. A liquid crystal display system for a motorcycle, comprising
- a liquid crystal plate element having a display surface and a back surface, said display surface facing to the rear of the motorcycle and said liquid crystal plate element being arranged on the motorcycle to recieve ambient light on said back surface thereof;
- a semi-transparent reflecting plate mounted at said back surface of said liquid crystal plate element;
- a control unit mounted below said plate element on the motorcycle;
- an electrical connection between said plate element and said control unit; and
- a frame holding said liquid crystal plate element and said semi-transparent reflecting plate and having a visor extending above said display system toward the rear of the motorcycle.

13. A liquid crystal display system for a motorcycle having a fairing, said motorcycle comprising
- a liquid crystal plate element having a display surface and a back surface, said display surface facing to the rear of the motorcycle and said liquid crystal plate element being arranged on the motorcycle to receive ambient light on said back surface thereof;
- a control unit mounted below said plate element on the motorcycle;
- an electrical connection between said plate element and said control unit; and
- a translucent plate fitted into the fairing opposite the back surface of said liquid crystal plate element.

* * * * *